3,488,402
DEHYDROGENATION OF HYDROCARBONS USING DEHYDROGENATION-OXIDATION CATALYST SYSTEM
Glenn O. Michaels, South Holland, and John H. Baudino, Chicago Heights, Ill., assignors to Sinclair Research, Inc., New York, N.Y., a corporation of Delaware
No Drawing. Filed May 18, 1967, Ser. No. 639,266
Int. Cl. C07c 11/16, 5/18; B01j 11/06
U.S. Cl. 260—680                                   16 Claims

ABSTRACT OF THE DISCLOSURE

Aliphatic chain-containing hydrocarbons are dehydrogenated to olefins and/or diolefins by contacting at elevated temperatures with a dehydrogenation catalyst, e.g., chromia-alumina, and with a reducible oxidation catalyst, e.g., bismuth vanadate, which is selective in the conversion of hydrogen to water and in the conversion of olefins to diolefins. Introduction of air is unnecessary as oxygen is supplied by the reducible catalyst. The two catalysts may be present in the same reactor, or dehydrogenation catalyst may be used in the first, and oxidation catalyst in a trailing reactor.

---

This invention relates to an improved process for the dehydrogenation of hydrocarbons to form olefins and/or diolefins. More particularly, this invention concerns the use of a dehydrogenation-oxidation catalyst system for improving the recovery of olefins and/or diolefins.

In the dehydrogenation of paraffins to form olefins and/or diolefins, high temperatures and vacuum operation are usually necessary or desirable in order to obtain favorable thermodynamic equilibria. Vacuum operation requires that the effluent gases from the reactor be compressed to atmospheric pressure or higher before the products are purified and recovered. Thus, the yields of olefins and/or diolefins per pass in most commercial units are limited by thermodynamics and also by the capacity of the compressors to compress the large amounts of hydrogen and other light hydrocarbons back to atmospheric pressure. One alternative to using conventional dehydrogenation catalysts is to use an oxidative dehydrogenation process which is not thermodynamically limited and one in which large volumes of hydrogen are not produced. However, the usual oxidation catalysts show relatively poor selectivitiy for the conversion of paraffins to olefins and/or diolefins. Another alternative is to use a conventional dehydrogenation catalyst in conjunction with an oxidation catalyst, see for example, U.S. Patent Nos. 3,119,111 and 3,161,670. However, in these oxidation processes, oxygen is generally added to the system as air, and the 80% nitrogen component of the air greatly increases the load on the compressor units. Moreover, the amount of oxygen gas present as oxidant must be controlled so that the hydrogen and oxygen gases do not become major components in the mixture of hydrocarbon reactants.

In accordance with the process of the present invention, an improved hydrocarbon dehydrogenation process has been developed which when operated at the same conversion level as conventional dehydrogenation systems, produces a product with an increased carbon to hydrogen ratio and, more specifically, improves the recovery of olefins and/or diolefins.

The hydrogenation process of the present invention involves the use of a particular catalyst system, namely a combination of a dehydrogenation catalyst with an oxidation catalyst which is reducible to a lower valence state and is selective in the conversion of hydrogen to water, and in the conversion of olefins to diolefins. No air is added to this system since the oxidation catalyst itself serves as an oxygen source during its reduction. Since the dehydrogenation process is a cyclic process in which the conventional dehydrogenation catalyst is periodically regenerated with air, likewise, the oxidation catalyst can be reoxidized to its original state during the regeneration phase. The use of this particular catalyst system enables the obtaining of higher yields of diolefins per pass with no increase in load on the compressors. Another feature that this system offers is that it is possible to operate conventional dehydrogenation units at higher pressure and still obtain the same amount of diolefins in the effluent gas. Since vacuum operation is expensive, the present process advantageously either reduces the size of the compressor needed or greatly increases the capacity of the existing compressors.

The dehydrogenation catalyst used in the present invention to make olefins and/or diolefins can be any of the conventional catalysts generally employed, such as alumina, magnesia, or a combination thereof, promoted with up to about 40% of an oxide of a metal of Group IV-B, V-B or VI-B of the Periodic Table of the Elements as presented at pages 392–393 of the "Handbook of Chemistry and Physics," 35th edition, 1953–1954. Specific examples of such catalysts include alumina promoted with about 40% of any of chromium oxide, zirconium oxide and titanium oxide; magnesia promoted either with about 20% molybdenum oxide or about 40% zirconium oxide; magnesia-alumina promoted with about 20% vanadium oxide; and unsupported active chromium oxide. A particularly effective catalytic composition for dehydrogenating paraffin hydrocarbons is a two-component catalyst consisting of about 40% chromia and 60% alumina which can be prepared by the method disclosed in U.S. Patent No. 2,755,323.

The oxidation catalyst used in the method of the present invention to improve the conversion to olefins and/or diolefins is a suitable reducible oxidation catalyst such as the vanadates, molybdates, phosphomolybdates, tungstates and phosphotungstates of Group IV-A and V-A metals such as bismuth, arsenic, antimony, tin, etc. In all of these catalysts, the metals are in combination with oxygen, the amount of combined oxygen being dependent upon the oxidation-reduction potential of the environment during their use. A preferred catalyst is bismuth vanadate, in which up to about 50% of the bismuth may be substituted with other Group IV-A and V-A metals. During use, the bismuth vanadate is reduced to a lower valence state, but upon regeneration the active, higher valence form of the catalyst is regained.

The feeds of the present invention are hydrocarbons containing an aliphatic chain of 2 to about 20 or more carbon atoms, often of 4 or 5 to 12 carbon atoms. The feeds are usually non-acetylenic and often are saturated or olefinically-unsaturated hydrocarbons. Whether the primary reaction occurring is a straight dehydrogenation, as opposed to dehydrocyclization, will be dependent in large part upon the feed selected. Both dehydrogenation to create one or two double bond-containing products and dehydrocyclization may occur with some feeds.

Should non-cyclic monoolefins and/or diolefins be the desired products, the preferred feeds are aliphatic hydrocarbons of 4 to 6 carbon atoms, e.g., butane, isopentane, neohexane, etc., although, as aforementioned, they can have up to 12 or 20 or more carbon atoms. The feeds can be unsaturated but the preferred feeds are the normal and branched chain paraffins, including the cyclic paraffins such as cyclopentane and cyclohexane and their alkyl substituted derivatives. Equally suitable are aromatic feeds containing at least one or more dehydrogenatable aliphatic hydrocarbon groups, e.g., a lower alkyl group of, say, 2 to 4 carbon atoms, such as ethylbenzene. Among the unsaturated feeds which can be used are the olefins of $C_4$ to $C_6$ range which undergo dehydrogenation to yield dienes. Perhaps the greatest advantage with respect to yields and selectivities of desired product is obtained with the branched feeds of at least five carbon atoms, usually up to 12 carbon atoms, which contain a "neo," or quaternary, carbon atom.

In dehydrocyclization reactions the feed is usually a non-acetylenic, aliphatic hydrocarbon of 6 to 10 or up to, say, 20 carbon atoms and can be saturated or unsaturated. The preferred feeds for dehydrocyclization are branched chain hydrocarbons containing a chain length of at least 5 carbon atoms and at least 2 branched lower alkyl chains. Particularly preferred are the saturated branched feeds containing a quaternary carbon atom and a chain length of at least 5 carbon atoms. Also suitable feeds for dehydrocyclization are naphthenes, including gem naphthenes, and aromatic hydrocarbons substituted with at least one aliphatic hydrocarbon, e.g., alkyl, group of 6 or more carbon atoms.

The dehydrogenation process of the present invention is conducted under an elevated temperature, for instance about 900 to 1200° F., preferably about 950 to 1100° F. The pressure may often vary from about 0.1 to 0.8 atmosphere, preferably 0.1 to 0.5, and the contact time or weight hourly space velocity, which may be dependent upon the catalyst, temperature and pressure employed, will generally range from about 0.1 to 10 or more, preferably about 0.5 to 5, WHSV (weight of hydrocarbon per weight of catalyst per hour). The dehydrogenation cycle time may often be about 5 to 15 minutes. The oxidation catalyst can be placed in a separate reactor following a main reactor containing the dehydrogenation catalyst, or can be placed as a separate layer in the main reactor, or may even be dispersed throughout the main dehydrogenation catalyst bed. If the oxidation catalyst is incorporated in the same reactor with the dehydrogenation catalyst, the increase in production of olefins and/or diolefins is achieved at dehydrogenation conditions. If separate reactors are used, catalyst reducing conditions of about 0.1 to 0.8, preferably about 0.1 to 0.5, atmosphere, and a WHSV of about 0.1 to 10 or more, preferably about 0.5 to 5 WHSV. Any water which may be formed during the process can be removed from the product stream by conventional drying methods well known in the art. After dehydrogenation and oxidation can be effected in the oxidation catalyst-containing reactor by employing elevated temperatures, e.g., greater than about 800° F., preferably about 900–1200° F., pressures the catalyst system can be purged and regenerated with air at a temperature of about 500 to 1200° F. The regeneration time is often about 5 to 15 minutes.

The following examples are illustrative only and are not to be considered as limiting. Example I illustrates the preparation of a typical oxidation catalyst used in the process of the present invention.

EXAMPLE I

A bismuth vanadate catalyst was prepared by dissolving 480 grams of bismuth nitrate in deionized water containing 75 ml. of concentrated nitric acid, diluting the solution to 800 ml. and adding 90 grams of vanadium pentoxide suspended in 1000 ml. of deionized water. The bismuth nitrate was added to the vanadium pentoxide suspension over a 20 minute period, the temperature of the vanadium pentoxide suspension being maintained between about 160 and 170° F. during the addition. Next, 120 ml. of concentrated $NH_4OH$ was diluted with water to 1 liter and added over a ten minute period to the mixture. The resultant slurry was stirred and heated at about 160° F. for 1 hour. Additional concentrated $NH_4OH$ was added to bring the pH to 7. The slurry was digested for 1 hour at 180° F., filtered, washed and oven-dried. The dried catalyst was then tableted to ⅛" by ⅛" size and calcined three hours at 1050° F. The catalyst, which has a bismuth to vanadium ratio of about 1:1, was ready for use in the dehydrogenation process of the present invention. After use, regeneration of the bismuth vanadate catalyst can be accomplished by passing air over the catalyst at temperatures above about 500° F., usually not greater than 1200° F.

EXAMPLE II 209 grams of a commercial alumina-chromia butane dehydrogenation catalyst were charged to a 1" Universal type main reactor. 262.5 grams (100 cc.) of the bismuth vanadate catalyst of Example I were placed in a separate reactor following the main reactor. This catalyst system was then evaluated in two different runs for the dehydrogenation of n-butane. After each run, both catalysts were regenerated with air. Test conditions and results for Runs 1 and 2 are given in Table I.

TABLE I
[Feed: n-Butane (C.P.)]

|  | Run No. | | | |
|---|---|---|---|---|
|  | 1 | 2 | 3 | 4 |
|  | Catalyst (Main Reactor) | | | |
|  | Butane Dehydrogenation Catalyst (Alumina-chromia) | | | |
| Conditions: | | | | |
| Temperatures, ° F. | 1,012 | 1,035 | 1,011 | 1,018 |
| WHSV | .94 | .53 | 1.06 | 1.04 |
| Exit pressure, mm. of Hg | 145 | 133 | 134 | 135 |
| Cycle length, min. | 15 | 15 | 15 | 15 |
| Catalyst (second reactor) | Bi-V | Bi-V | None | (²) |
| Temperature (second reactor), ° F. | ¹ 1,110 | ¹ 1,024 | | 668 |
| Conversion of n-Butane, wt. percent | 51.1 | 60.4 | 51.5 | 38.3 |
| Selectivity to butadiene, mole percent | 25.1 | 27.4 | 13.6 | 10.8 |
| Selectivity to butenes plus butadiene, mole percent | 93.1 | 90.7 | 94.4 | 89.3 |
| Butadiene yield, moles of butadiene/moles of feed | 12.7 | 16.48 | 7.05 | 4.12 |
| $H_2$ yield, Moles of $H_2$/moles of butadiene | 4.46 | 4.52 | 8.6 | 15.0 |

¹ Initial temperature. Temperatures dropped as the catalyst was reduced.
² Cu-exc. Zeolon.

In Run 3 the second reactor, containing the bismuth vanadate catalyst, was removed from the system and dehydrogenation of n-butane conducted over the alumina-chromia catalyst alone.

Run 4 in Table I illustrates the use of a reducible metal oxide-containing oxidation catalyst which, unlike those of the present invention, is non-selective in its activity. The catalyst was a copper-exchanged Zeolon (mordenite) catalyst.

Runs 1 and 2 illustrate the advantage of using the bismuth vanadate catalyst system over the conventional dehydrogenation catalyst systems. Comparison of runs 1 and 3 (made at nearly identical conditions) shows that the conversion of n-butane was about the same for both catalyst systems, but the selectivity to butadiene was essentially doubled with the bismuth vanadate-containing system. Also, the butadiene yield per pass was increased from 7.05 to 12.7% and the yield of hydrogen produced, per mole of butadiene formed, was decreased from 8.6 to 4.46 by use of the bismuth vanadate in a trailing reactor. Similar improvements can be noted in run 2.

Not all catalysts containing reducible metal oxides are suitable for use in the oxidative-dehydrogenation process of the present invention, as is shown by the data on the copper-exchanged Zeolon catalyst used in run 4. In this case, the copper oxide is reduced to metallic copper with the formation of water, but this catalyst also converts butadiene and butene to carbon dioxide, cracked products, and coke, which side conversions lower the selectivity to butadiene and increase hydrogen production.

It is claimed:

1. A method for the dehydrogenation of hydrocarbons containing an aliphatic chain of 2 to about 20 carbon atoms to produce the corresponding olefins and/or diolefins which consists essentially of contacting said hydrocarbons in the absence of extraneous oxygen with a dehydrogenation catalyst which either consists essentially of alumina, magnesia, or a combination of alumina and magnesia, promoted with an oxide of a metal of Group IV–B, V–B, or VI–B of the Periodic Table of the Eelements, or consists essentially of unsupported active chromium oxide, under dehydrogenation conditions including a temperature of about 900 to 1200° F. and with an oxidation catalyst selected from the group consisting of vanadates, molybdates, phosphomolybdates, tungstates and phosphotungstates of Group IV–A and V–A metals to produce an effluent stream containing an increased amount of olefins and/or diolefins.

2. The method of claim 1 wherein the dehydrogenation catalyst and the oxidation catalyst are incorporated in the same reactor.

3. The method of claim 1 wherein the dehydrogenation catalyst is incorporated in a lead reactor and the oxidation catalyst is incorporated in a trailing reactor.

4. The method of claim 1 wherein the oxidation catalyst is selected from the group consisting of vanadates, molybdates, phosphomolybdates, tunstates and phosphotungstates of metals selected from the group consisting of bismuth, antimony, and tin.

5. A method for the dehydrogenation of aliphatic hydrocarbons of about 4 to 12 carbon atoms to produce the corresponding olefins and/or dilefins which consists essentially of contacting said aliphatic hydrocarbons in the absence of extraneous oxygen with a dehydrogenation catalyst which either consists essentially of alumina, magnesia, or a combination of alumina and magnesia, promoted with an oxide of a metal of Group IV–B, V–B, or VI–B of the Periodic Table of the Elements, or consists essentially of unsupported active chromium oxide, under dehydrogenation conditions including a temperature of about 950 to 1100° F. and with an oxidation catalyst selected from the group consisting of vanadates, molybdates, phosphomolybdates, tungstates and phosphotungstates of Group IVA and VA metals to produce an effluent stream containing an increased amount of olefins and/or diolefins.

6. The method of claim 5 wherein the oxidation catalyst is bismuth vanadate.

7. The method of claim 6 wherein the dehydrogenation catalyst is incorporated in a lead reactor and the oxidation catalyst is incorporated in a trailing reactor.

8. The method of claim 7 wherein the aliphatic hydrocarbon is n-butane and the effluent from the lead dehydrogenation reactor contains hydrogen, n-butene and butadiene.

9. The method of claim 8 wherein the bismuth vanadate oxidation catalyst is regenerated after the dehydrogenation reactor effluent is contacted therewith by passing air over the catalyst at a temperature of about 500 to 1200° F.

10. The method of claim 9 wherein the dehydrogenation catalyst consists essentially of alumina promoted with chromium oxide.

11. The metod of claim 5 wherein the aliphatic hydrocarbon is a normal, branched chain or cyclic paraffin of 4 to 6 carbon atoms.

12. The method of claim 11 wherein the dehydrogenation catalyst is incorporated in a lead reactor and the oxidation catalyst is incorporated in a trailing reactor.

13. The method of claim 12 wherein both reactors are operated at pressures of about 0.1 to 0.5 atmosphere and at space velocities of about 0.5 to 5 WHSV.

14. The method of claim 13 wherein the dehydrogenation catalyst consists essentially of alumina promoted with chromium oxide.

15. The method of claim 14 wherein the oxidation catalyst is bismuth vanadate.

16. The method of claim 15 wherein the aliphatic hydrocarbon is n-butane and the effluent from the lead dehydogenation reactor contains hydrogen, n-butene and butadiene.

References Cited

UNITED STATES PATENTS

| | | | |
|---|---|---|---|
| 2,884,473 | 4/1959 | Reilly et al. | 260—680 |
| 3,050,572 | 8/1962 | Masterton et al. | 260—680 |
| 3,161,670 | 12/1964 | Adams et al. | |
| 3,218,368 | 11/1965 | Neale | 260—683.3 |

PAUL M. COUGHLAN, Jr., Primary Examiner

U.S. Cl. X.R.

252—464; 260—683.3

UNITED STATES PATENT OFFICE
CERTIFICATE OF CORRECTION

Patent No. 3,488,402        Dated January 6, 1970

Inventor(s) Glenn O. Michaels and John H. Baudino

It is certified that error appears in the above-identified patent and that said Letters Patent are hereby corrected as shown below:

Column 1, line 68, "hydrogenation" should read --dehydrogenation--.

Column 3, line 43, after "conditions" insert --can be effected in the oxidation catalyst-containing reactor by employing elevated temperatures, e.g., greater than about 800°F, preferabl about 900-1200°F, pressures--.

Column 3, line 73-75, delete "can be effected in the oxidation catalyst-containing reactor by employing elevated temperatures, e.g., greater than about 800°F, preferably about 900-1200°F, pressurer--.

Column 4, line 22, "160°F" should read --165°F--.

Column 6, line 27, "method" should read --method--.

Signed and sealed this 30th day of March 1971.

(SEAL)
Attest:

EDWARD M. FLETCHER, JR.
Attesting Officer

WILLIAM E. SCHUYLER, JR.
Commissioner of Patents